United States Patent Office 3,099,524
Patented July 30, 1963

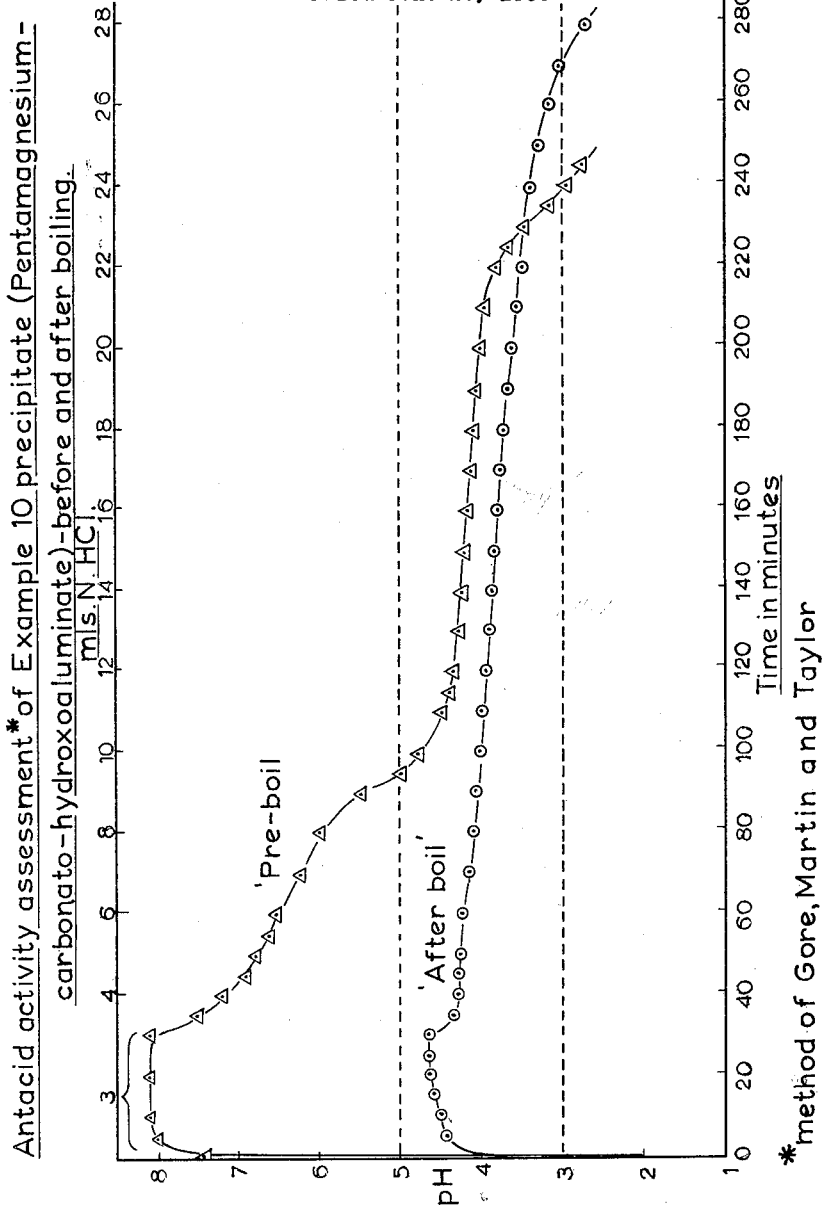

3,099,524
ANTACID COMPOSITIONS
Frederick Grossmith, Pinner, England, assignor to Beecham Research Laboratories Limited, Brentford, Middlesex, England
Filed June 28, 1960, Ser. No. 39,245
Claims priority, application Great Britain July 2, 1959
6 Claims. (Cl. 23—14)

This invention relates to improvements in antacid compositions and is particularly concerned with new chemical compounds which have been found to have desirable antacid properties being eminently suitable for medicinal use for the treatment of gastric hyperacidity.

In my co-pending application Serial No. 842,042, filed September 24, 1959, now abandoned, I have disclosed certain novel compounds which are formed by reacting aluminium and magnesium salts with caustic alkalis, in which the magnesium content, expressed as $Mg(OH)_2$, lies between the approximate limits 25% to 75% by weight of the substantially dry product and in which the aluminium content, expressed as $Al(OH)_3$, lies between the approximate limits 75% to 25%. These compounds, which we have termed magnesium hydroxoaluminates, have exceptionally desirable properties as antacids.

We have now found that in magnesium hydroxoaluminates the complex hydroxoaluminate ion is readily penetrated by bicarbonate ions which replace the hydroxo groups and that novel compounds are formed having a constant ratio of two atoms of aluminium to one bicarbonate ion.

Accordingly, the present invention provides new compounds which are magnesium carbonato hydroxoaluminates having the general formula $$Mg_n[Al_2(OH)_{5+2n}.HCO_3] \qquad (I)$$

where $n$ is an integer from 1 to 5.

The complete series of novel compounds is as follows:

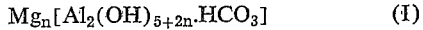

|  | Molecular weight | Mg | Al | Mg(OH)₂ | Al(OH)₃ | CO₂ |
|---|---|---|---|---|---|---|
| Mg[Al₂(OH)₇.HCO₃] | 258.35 | 9.42 | 20.58 | 22.58 | 60.38 | 17.04 |
| Mg₂[Al₂(OH)₉.HCO₃] | 316.69 | 15.36 | 17.04 | 36.84 | 49.26 | 13.90 |
| Mg₃[Al₂(OH)₁₁.HCO₃] | 375.03 | 19.46 | 14.39 | 46.67 | 41.59 | 11.74 |
| Mg₄[Al₂(OH)₁₃.HCO₃] | 433.36 | 22.45 | 12.46 | 53.83 | 36.01 | 10.16 |
| Mg₅[Al₂(OH)₁₅.HCO₃] | 491.70 | 24.72 | 10.98 | 59.29 | 31.76 | 8.95 |

The lower members of the series of the new compounds may be prepared by reacting a cold solution of magnesium bicarbonate or a cold solution of a magnesium salt and sodium bicarbonate, with a cold solution of an alkali aluminate, e.g. sodium aluminate. The higher members of the series cannot be prepared by this method as the magnesium is partially precipitated as basic carbonate.

Alternatively, the compounds may be prepared by reacting a solution of the appropriate amount of salts of aluminium and magnesium with a mixture of sodium hydroxide and sodium carbonate in appropriate amounts. The aluminium and magnesium salts are preferably the chlorides.

A further method for preparing the compounds of the present invention is to suspend a magnesium hydroxoaluminate of the type disclosed in by said co-pending application Serial No. 842,042, filed September 24, 1959, in a liquor containing bicarbonate ions. A suitable liquor is a dilute solution of magnesium bicarbonate.

A still further method for preparing the magnesium bicarbonate hydroxoaluminates, which method minimises the formation of a basic magnesium carbonate impurity, is to react a solution containing aluminium and magnesium salts in appropriate amounts with sodium hydroxide at a suitable rate of delivery. An addition of sodium bicarbonate is made at an appropriate stage and a final addition of mixed sodium hydroxide and sodium bicarbonate is made to precipitate all the magnesium without allowing the pH to rise too high.

Yet a further method of preparing the magnesium bicarbonate hydroxoaluminates is to react a solution containing aluminium and magnesium salts in appropriate amounts with a solution of sodium carbonate. The carbon dioxide evolved from the reaction of sodium carbonate with the aluminium salt gives rise to bicarbonate ions and prevents the pH from rising high enough for the direct precipitation of basic magnesium carbonate. A proportion of the double compound

$$NaMgH(CO_3)_2.4H_2O$$

may be formed. As with the magnesium hydroxoaluminates, an inclusion of ammonium chloride limits the precipitation of magnesium carbonate and thereby restricts double compound formation. A suitable after treatment, for example, boiling the slurry, breaks down the residual double compound and completes the reaction to form magnesium carbonato hydroxoaluminates.

Yet another method of preparing the magnesium carbonato hydroxoaluminates is to react a slurry prepared from basic magnesium carbonate, preferably Light Magnesium Carbonate B.P., and a solution of sodium carbonate with a solution of aluminium chloride. The reaction may be initiated in the cold and after diluting to a suspension containing approximately 5% solids w./v. by boling for a period.

The following examples illustrate the invention:

*Example 1*

A solution of sodium aluminate, $Na_3[Al(OH)_6]$ was prepared from 48.27 g. of $AlCl_3.6H_2O$ and 64.00 g. of NaOH by adding slowly a solution of the aluminium chloride in 500 mls. of water to a solution of the sodium hydroxide in 500 mls. of water at room temperature.

The clear solution produced was added to 1,760 mls. of a 2.5% solution of magnesium bicarbonate containing free carbon dioxide and in which the pH was adjusted to 9 by the addition of sodium hydroxide. At this point of addition of sodium hydroxide the solution was just beginning to appear opalescent. The addition of sodium aluminate solution to magnesium bicarbonate solution was made at room temperature with constant stirring. Finally, the precipitate was washed on a basket type centrifuge and was dried at 52° C.

*Example 2*

The following solutions were prepared:

MgCl$_2$.6H$_2$O, 61 g. ──────────── ⎫ In water to give 500
AlCl$_3$.6H$_2$O, 24.15 g. ────────── ⎭ mls. of solution.
NaOH, 32 g. ──────────────── ⎫ In water to give 500
Na$_2$CO$_3$, 10.6 g. ─────────────── ⎭ mls. of solution.

The solutions were heated to 70° C. and then mixed by pouring simultaneously into a 2 litre beaker. While continuing to stir with a twin blade propeller type stirrer the slurrry was heated to 90° C. and incubated at this temperature for 20 minutes. The material was then washed on a basket type centrifuge and dried at 52° C. This material contained as impurity magnesium hydrate and/or basic magnesium carbonate which impurity was removed by digestion with a solution of ammonium chloride to give magnesium carbonato hydroxoaluminate. Formula I $n=5$ (2a).

*Example 3*

The following solutions were prepared:

MgCl$_2$.6H$_2$O, 68.37 g. ────────── ⎫ In water to give 500
AlCl$_3$.6H$_2$O, 59.73 g. ────────── ⎭ mls. of solution.
NaOH, 113.98 g. ──────────────. In water to give 500 mls. of solution.

The solutions were heated to 90° C. then mixed by adding the NaOH solution to the mixed chloride solution, over a period of 2 minutes. The mixture was incubated at 90° C. for 10 minutes.

The precipitate was washed by decantation in a 5 litre beaker, using as wash liquor 50 litres of approximately 0.04% w./v. solution of magnesium bicarbonate in distilled water. It was then filtered and washed on the filter with distilled water, finally being dried at 52° C.

*Example 4*

The same quantities of reactants as those shown in Example 3 were employed and the procedure followed was similar, except that washing by decantation was carried out using mains water containing 268 mg. per litre of carbonate hardness. Again, the precipitate was dried at 52° C.

*Example 5*

The following solutions were prepared:

MgCl$_2$.6H$_2$O, 31.35 g. ────────── in distilled water to give 1 litre of solution.
AlCl$_3$.6H$_2$O, 74.4 g. ──────────── Do.
NaOH, 43.2 g. ────────────────── In distilled water to give 1½ litres of solution.
NaHCO$_3$, 12.9 g. ──────────────── In distilled water to give 250 mls. of solution.

A solution of sodium sesquicarbonate was prepared to contain 190 g. in distilled water to give 1½ litres of solution.

The aluminium and magnesium chloride solutions were added to a 5 litre beaker. The sodium hydroxide solution was transferred to a dropping funnel and this solution was introduced dropwise into the mixed chloride solution, which was agitated using a twin blade propeller type stirrer, the mixing being carried out at room temperature. During the addition of the sodium hydroxide a periodic check of pH was made and when the pH was approximately 7.0 the sodium bicarbonate solution added to the mixture.

At the completion of the addition of the sodium hydroxide (after approximately 1 hour), 500 mls. of the sodium sesquicarbonate solution were added, when it was found that magnesium ion in the supernatant liquor was reduced to 100 p.p.m. The precipitate was then washed with distilled water on a basket type centrifuge and was dried at 52° C.

*Example 6*

The following solutions were prepared:

MgCl$_2$.6H$_2$O, 51.25 g. ─────────── In distilled water to give 150 mls. of solution.
AlCl$_3$.6H$_2$O, 21.38 g. ─────────── Do.
NaOH, 26.96 g. ──────────────── In distilled water to give 200 mls. of solution.
NaHCO$_3$, 141.4 g. ──────────────── In distilled water to give 2 litres of solution.

The solution of aluminium chloride was added slowly to the solution of sodium hydroxide, with vigorous stirring. The sodium aluminate solution so prepared was added to the mixed magnesium chloride solution and sodium bicarbonate solution, the mixing being carried out at room temperature, with constant stirring employing a twin blade propeller type stirrer. The precipitate was washed, employing a basket type centrifuge and was then dried at 52° C.

A portion of approximately 6 g. of the precipitate was suspended in 300 mls. of an approximately 2 volume solution of carbon dioxide in water for 8 hours. After suspension in the carbonated water, the precipitate was again washed and dried at 52° C. The molar ratio Mg:Al of the precipitate before suspending in carbonated water was 1.7:1 and a pH peak of 7.4 was found on the activity test of Gore, Martin and Taylor, J. Pharm. and Pharmacol., 5, 686–691, 1953. After suspension the molar ratio Mg:Al was 1.01:1, and the pH peak on the activity test was 5.2.

*Example 7*

The following solutions were prepared:

MgCl$_2$.6H$_2$O, 68.1 g ────── In distilled water to give 1 litre of solution.
AlCl$_3$.6H$_2$O, 40.4 g ────── Do.
NaOH, 40.2 g ────────── In distilled water to give 1½ litres of solution.
NaHCO$_3$, 14.08 g ──────── In distilled water to give 250 mls. of solution.

Sodium sesquicarbonate solution—prepared as in Example 5.

The procedure followed was identical with that described in Example 5, but 1,200 mls. of sodium sesquicarbonate was employed.

Example 8

The following solutions were prepared:

$MgCl_2.6H_2O$, 94.2 g — In distilled water to give 1 litre of solution.
$AlCl_3.6H_2O$, 31.75 g — Do.
NaOH, 50.0 g — In distilled water to give 1½ litres of solution.
$NaHCO_3$, 5.53 g — In distilled water to give 100 mls. of solution.
Sodium sesquicarbonate solution—prepared as in Example 5.

The procedure followed was identical with that described in Example 5, but 1,700 mls. of sodium sesquicarbonate solution were employed. At this stage, the supernatant solution contained not more than 250 p.p.m. of magnesium ion.

Example 9

The following solutions were prepared:

$MgCl_2.6H_2O$, 61.0 g — In distilled water to give 1½ litres of solution.
$AlCl_3.6H_2O$, 24.15 g — Do.
NaOH, 36.0 g — Do.

The sodium hydroxide solution was added to the mixed chloride solution as a drip feed. About 1 hour was taken to complete the addition and throughout the mixing period the suspension was stirred with a propeller type stirrer. At the end of the addition a further 15 minutes stirring was given and the precipitate was washed with distilled water on a basket type centrifuge. The precipitate was then dried at 52° C.

The precipitate was suspended in a 5% solution of sodium bicarbonate in distilled water at the rate of 100 mls. of solution for each 4 g. of precipitate. The suspension was allowed to stand overnight and was then filtered and washed. This precipitate contained magnesium hydrate and/or basic magnesium carbonate as impurity.

The precipitate was digested with a 2 M solution of ammonium chloride for 4 hours, the precipitate again being washed and dried at 52° C. After digestion with the ammonium chloride the material 9(a) corresponded to the $Mg_5$ carbonate hydroxoaluminate.

Example 10

The following solutions were prepared:

$MgCl_2$, 5,940 g — As 13.4 litres of 45.2% w./v. solution.
$AlCl_3$, 3,330 g — As 9.52 litres of 35.0% w./v. solution.
$Na_2CO_3$, 15,850 g — As 72.0 litres of 22.0% solution.

The magnesium and aluminium chloride solutions were mixed and the mixed solutions and the sodium carbonate solution both heated to 95° C. were then reacted with stirring and the slurry centrifuged off. The centrifuge cake was then made up to 1½% slurry dilution with tap water, and allowed to stand overnight, the supernatant solution being siphoned off. Further tap water was then added to produce 1½% slurry concentration and this was boiled for 30 minutes, then cooled to 80° C., centrifuged and the filter cake dried at 50–55° C.

A sample of the material was withdrawn prior to the boiling procedure, and this example was examined separately, being referred to as "pre-boil material."

Example 11

The following solutions were prepared:

$MgCl_2$, 5,930 g — As 13.76 litres of 43.10% w./v. solution.
$AlCl_3$, 3,330 g — As 9.45 litres of 35.26% w./v. solution.
$Na_2CO_3$, 11,140 g — As 48.90 litres of 23.2% w./v. solution.
$NH_4Cl$, 542 g — Dissolved in 2 litres of water.
HCl, 505 mls. of 36% w./v. solution diluted to 2½ litres.

The magnesium, aluminum and ammonium chlorides were mixed and heated to 80° C. and then reacted with the sodium carbonate solution to 80° C. The reaction mixture was stirred for 5 minutes and then cold water added to produce a 1½% slurry concentration. The slurry was heated to 100° C. and the hydrochloric acid solution added over a period of 30 minutes, the boiling continuing for a further 30 minutes. The precipitate was washed by decantation, centrifuged off and dried at 50–55° C.

Example 12

The following reactants were taken:

Light magnesium carbonate B.P., 58 kgms.
$Na_2CO_3$, 40.5 kgms — 153 litres of 26% w./v. solution.
$AlCl_3$, 34.4 kgms — 102 litres of 33.8% w./v. solution.

The magnesium carbonate and the solution of sodium carbonate were mixed with additional water to form a slurry and the aluminum chloride solution was added slowly over a period of half an hour with stirring. The slurry was diluted with main water to give approximately 1268 litres of mixture and was then boiled for three hours. The slurry was then washed and concentrated on a hydroextractor, filtered and dried at a temperature of 100° C. Magnesium and aluminum losses in the effluents during processing were negligible.

Some of the properties of the precipitates are shown in the following tables:

| Properties | Examples | | | | |
| --- | --- | --- | --- | --- | --- |
| | 1 | 2 | 2(a) | 3 | 4 |
| Appearance of dried material | Off white | White | White | White | Off white |
| Apparent density, g./cc | 0.94 | 0.88 | | 0.45 | 0.4 |
| Moisture over $P_2O_5$, percent | 10.5 | 7.5 | | 4.55 | 1.40 |
| pH of slurry | 9.5 | 8.7 | | 8.8 | 8.0 |
| Antacid activity (dry basis),[1] mls. N. HCl | 24.8 | 29.7 | | 29.6 | 28.0 |
| Highest pH on activity curve | 5.6 | 7.2 | 4.8 | 5.1 | 5.3 |
| Percent: | | | | | |
| Aluminum as $Al_2O_3$ | 21.26 | 14.83 | 18.72 | 17.95 | 16.40 |
| Magnesium as MgO | 27.87 | 35.81 | 36.56 | 36.36 | 32.80 |
| Loss on ignition | 50.90 | 48.00 | | 45.80 | 43.40 |
| | 100.03 | 98.64 | | 100.11 | [2] 99.87 |
| Carbon dioxide, percent | 10.41 | 7.96 | | 8.75 | 14.00 |
| Sodium content, percent | 0.76 | | | [3] 100 | [3] 560 |

[1] Method of Gore, Martin and Taylor.
[2] Including 7.27% calcium as CaO.
[3] P.p.m.

| Properties | Examples | | | | | |
|---|---|---|---|---|---|---|
| | 5 | 6 | 7 | 8 | 9 | 9(a) |
| Appearance of dried material | White | White | White | White | White | White |
| Apparent density, g/cc | 0.95 | 0.92 | 0.80 | 0.95 | 1.1 | ---- |
| Moisture over $P_2O_5$, percent | 11.4 | 14.6 | 8.0 | 8.8 | 5.5 | ---- |
| pH of slurry | 9.4 | 8.0 | 7.9 | 7.3 | 8.5 | 6.8 |
| Antacid activity (dry basis),[1] mls. N.HCl | 24.0 | 32.8 | 23.4 | 27.2 | 28.0 | ---- |
| Highest pH on activity curve | 4.8 | 5.2 | 4.9 | 5.9 | 6.6 | 4.8 |
| Percent: | | | | | | |
| Aluminum as $Al_2O_3$ | 29.89 | 24.28 | 20.16 | 16.10 | 14.38 | 17.42 |
| Magnesium as MgO | 11.27 | 18.65 | 29.35 | 33.09 | 39.83 | 36.59 |
| Loss on ignition | 49.90 | 49.70 | 48.60 | 53.40 | 47.00 | ---- |
| | 91.06 | 92.63 | 98.11 | 102.59 | 101.21 | ---- |
| Carbon dioxide, percent | 15.1 | 12.08 | 8.4 | 7.91 | 7.7 | 5.7 |
| Sodium content, percent | ---- | ---- | [3] 300 | [3] 170 | 0.12 | ---- |

| Properties | Examples | | | |
|---|---|---|---|---|
| | 10 (pre-boil) | 10 (after-boil) | 11 | 12 |
| Appearance of dried material | White | White | White | White |
| Apparent density, g./cc | 0.32 | 0.42 | 0.55 | 0.33 |
| Moisture over $P_2O_5$, percent | 8.0 | 2.8 | 6.3 | 1.6 |
| pH of slurry | 9.1 | 8.8 | 8.0 | 9.0 |
| Antacid activity (dry basis), mls. N. HCl | 26.0 | 29.0 | 28.8 | 26.0 |
| Highest pH on activity curve | 8.3 | 4.8 | 4.85 | 4.9 |
| Percent: | | | | |
| Aluminium as $Al_2O_3$ | 18.14 | 17.95 | 16.97 | 18.68 |
| Magnesium as MgO | 33.16 | 33.33 | 33.18 | 34.2 |
| Loss on ignition | 50.5 | 44.7 | 45.8 | ---- |
| | 101.80 | 95.98 | 95.95 | ---- |
| Carbon dioxide, percent | 12.7 | 8.8 | 6.95 | 8.9 |
| Sodium content, percent | 1.33 | 0.35 | ---- | ---- |

The activity curve is shown in the accompanying drawing.

The material of Examples 1 to 11 correspond to the following compositions:

*Example 1*

| | Percent |
|---|---|
| $Mg[Al_2(OH)_{11}.HCO_3].2H_2O$ | 89.5 |
| Water | 10.5 |
| | 100.0 |

*Example 2*

| | |
|---|---|
| $Mg(OH)_2.Mg_5[Al_2(OH)_{15}.HCO_3].4H_2O$ | 92.5 |
| Water | 7.5 |
| | 100.0 |

*Example 3*

| | |
|---|---|
| $Mg[Al_2(OH)_{15}.HCO_3].H_2O$ | 95.45 |
| Water | 4.55 |
| | 100.00 |

*Example 4*

| | |
|---|---|
| $Mg_5[Al_2(OH)_{15}.HCO_3].2H_2O$ | 85.62 |
| $CaCO_3$ | 12.98 |
| Water | 1.40 |
| | 100.00 |

*Example 5*

| | |
|---|---|
| $Mg[Al_2(OH)_7.HCO_3].2H_2O$ | 88.6 |
| Water | 11.4 |
| | 100.0 |

*Example 6*

| | |
|---|---|
| $Mg_2[Al_2(OH)_9.HCO_3].2H_2O$ | 85.4 |
| Water | 14.6 |
| | 100.0 |

*Example 7*

| | |
|---|---|
| $Mg_4[Al_2(OH)_{13}.HCO_3].3H_2O$ | 92.0 |
| Water | 8.0 |
| | 100.0 |

*Example 8*

| | |
|---|---|
| $Mg_5[Al_2(OH)_{15}.HCO_3].4H_2O$ | 91.2 |
| Water | 8.8 |
| | 100.0 |

*Example 9*

| | |
|---|---|
| $Mg(OH)_2.Mg_5[Al_2(OH)_{15}.HCO_3.].3H_2O$ | 94.5 |
| Water | 5.5 |
| | 100.0 |

*Example 10.—Pre-Boil Material*

| | |
|---|---|
| $MgNaH(CO_3)_2.2H_2O$ | 12 |
| $Mg_5[Al_2(OH)_{15}.HCO_3]$ | 24 |
| $Mg_4[Al_2(OH)_{13}.HCO_3]$ | 56 |
| Water | 8 |
| | 100 |

Example 10.—After-Boil Material

| | |
|---|---|
| $MgNaH(CO_3)_2 \cdot 2H_2O$ | 3.0 |
| $Mg_5[Al_2(OH)_{15} \cdot HCO_3] \cdot 3H_2O$ | 94.2 |
| Water | 2.8 |
| | 100.0 |

Example 11

| | |
|---|---|
| $Mg_5[Al_2(OH)_{15} \cdot HCO_3] \cdot 3H_2O$ | 95.0 |
| Water | 6.33 |
| Cl | 1.9 |
| | 98.48 |

Example 12

| | |
|---|---|
| $Mg_5[Al_2(OH)_{15} \cdot HCO_3] \cdot 3H_2O$ | 98.4 |
| Water | 1.6 |
| | 100.0 |

In terms of metal or metal hydroxide and carbon dioxide, the magnesium and aluminium contents of the materials, found by assay, compared with those corresponding to the composition given above, are as follows:

| Example | Component | Expected, percent | Found, percent |
|---|---|---|---|
| 1 | $Mg(OH)_2$ | 38.11 | 40.31 |
|   | $Al(OH)_3$ | 33.96 | 32.56 |
|   | $CO_2$ | 9.59 | 10.41 |
|   |   | 81.66 | 83.28 |
| 2 | $Mg(OH)_2$ | 52.05 | 51.80 |
|   | $Al(OH)_3$ | 23.20 | 22.69 |
|   | $CO_2$ | 6.54 | 7.96 |
|   |   | 81.79 | 82.45 |
| 3 | $Mg(OH)_2$ | 54.59 | 55.50 |
|   | $Al(OH)_3$ | 29.25 | 28.90 |
|   | $CO_2$ | 8.24 | 9.20 |
|   |   | 92.08 | 93.60 |
| 4 | $Mg(OH)_2$ | 47.30 | 47.43 |
|   | $Al(OH)_3$ | 25.34 | 25.09 |
|   | $CO_2$ | 12.84 | 14.00 |
|   | $CaO$ | 7.27 | 7.27 |
|   |   | 92.75 | 93.79 |
| 5 | $Mg(OH)_2$ | 17.56 | 16.31 |
|   | $Al(OH)_3$ | 46.95 | 45.72 |
|   | $CO_2$ | 13.25 | 15.10 |
|   |   | 77.76 | 77.13 |
| 6 | $Mg(OH)_2$ | 28.25 | 26.97 |
|   | $Al(OH)_3$ | 37.78 | 37.11 |
|   | $CO_2$ | 10.66 | 12.08 |
|   |   | 76.69 | 76.16 |

| Example | Component | Expected, percent | Found, percent |
|---|---|---|---|
| 7 | $Mg(OH)_2$ | 44.04 | 42.45 |
|   | $Al(OH)_3$ | 29.46 | 30.84 |
|   | $CO_2$ | 8.31 | 8.40 |
|   |   | 81.81 | 81.69 |
| 8 | $Mg(OH)_2$ | 47.16 | 47.86 |
|   | $Al(OH)_3$ | 25.27 | 24.63 |
|   | $CO_2$ | 7.12 | 7.91 |
|   |   | 79.55 | 80.40 |
| 9 | $Mg(OH)_2$ | 58.26 | 57.60 |
|   | $Al(OH)_3$ | 22.26 | 22.0 |
|   | $CO_2$ | 6.28 | 7.70 |
|   |   | 86.80 | 87.30 |
| 10 before boiling | Mg | 19.94 | 20.00 |
|   | Al | 9.61 | 9.6 |
|   | $CO_2$ | 13.1 | 12.7 |
|   | Na | 1.36 | 1.33 |
|   |   | 44.01 | 43.63 |
| 10 after boiling | Mg | 21.33 | 20.1 |
|   | Al | 9.33 | 9.5 |
|   | $CO_2$ | 8.89 | 8.8 |
|   | Na | 0.34 | 0.35 |
|   |   | 39.89 | 38.75 |
| 11 | $Mg(OH)_2$ | 48.21 | 47.98 |
|   | $Al(OH)_3$ | 25.83 | 25.95 |
|   | $CO_2$ | 7.27 | 6.95 |
|   |   | 81.31 | 80.88 |

I claim:

1. A magnesium carbonato hydroxoaluminate compound of the formula:

$$Mg_n[Al_2(OH)_{5+2n} \cdot HCO_3]$$

wherein $n$ is an integer of 1 to 5.

2. The magnesium carbonato hydroxoaluminate compound $Mg[Al_2(OH)_7 \cdot CO_3]$.
3. The magnesium carbonato hydroxoaluminate compound $Mg_2[Al_2(OH)_9 \cdot HCO_3]$.
4. The magnesium carbonato hydroxoaluminate compound $Mg_3[Al_2(OH)_{11} \cdot HCO_3]$.
5. The magnesium carbonato hydroxoaluminate compound $Mg_4[Al_2(OH)_{13} \cdot CO_3]$.
6. The magnesium carbonato hydroxoaluminate compound $Mg_5[Al_2(OH)_{15} \cdot HCO_3]$.

References Cited in the file of this patent

UNITED STATES PATENTS

| | | |
|---|---|---|
| 2,797,978 | Beekman | July 2, 1957 |
| 2,880,136 | Gore | Mar. 31, 1959 |
| 2,923,660 | Hallmann | Feb. 2, 1960 |
| 2,958,626 | Schenck et al. | Nov. 1, 1960 |